United States Patent
Shirakawa et al.

(10) Patent No.: US 12,523,499 B2
(45) Date of Patent: Jan. 13, 2026

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 271 days.

(21) Appl. No.: 18/199,585

(22) Filed: May 19, 2023

(65) Prior Publication Data
US 2023/0384124 A1 Nov. 30, 2023

(30) Foreign Application Priority Data

May 27, 2022 (JP) .................................. 2022-087005
Apr. 18, 2023 (JP) .................................. 2023-067642

(51) Int. Cl.
*G01D 5/20* (2006.01)
*B62D 3/12* (2006.01)

(52) U.S. Cl.
CPC .............. *G01D 5/20* (2013.01); *B62D 3/126* (2013.01)

(58) Field of Classification Search
CPC ........ G01D 5/20; G01D 3/02; G01D 2205/18; G01D 5/2053; B62D 3/126; B62D 15/0225
See application file for complete search history.

(56) References Cited

U.S. PATENT DOCUMENTS

| | | | | |
|---|---|---|---|---|
| 4,556,886 A | * | 12/1985 | Shimizu ................ | G01D 5/243 324/207.17 |
| 2002/0043972 A1 | * | 4/2002 | Irle ........................ | G01D 5/204 324/207.17 |
| 2009/0261844 A1 | * | 10/2009 | Howard ............... | G01D 5/2026 324/654 |
| 2018/0328759 A1 | * | 11/2018 | Herrmann .......... | G01D 5/24438 |
| 2024/0019276 A1 | * | 1/2024 | Berner ................. | G01D 5/2073 |

FOREIGN PATENT DOCUMENTS

WO  WO2021/210125  10/2021

* cited by examiner

*Primary Examiner* — Akm Zakaria
(74) *Attorney, Agent, or Firm* — McGinn I.P. Law Group, PLLC

(57) ABSTRACT

A position detection device for detecting a position of a shaft moving forward and backward in an axial direction is provided with a detection object attached to the shaft, an excitation coil for generating an alternating magnetic field, a power supply for supplying an alternating current to the excitation coil, and a detection coil arranged to be extending along an axial direction of the shaft and being interlinked with a magnetic flux of the alternating magnetic field. The excitation coil is arranged to surround the detection coil, and the detection coil includes a distorted curved portion being distorted with respect to a sine wave curve in such a manner that a peak value of a voltage induced in the detection coil changes into a sine wave shape when the shaft moves along the axial direction at a constant speed.

8 Claims, 12 Drawing Sheets

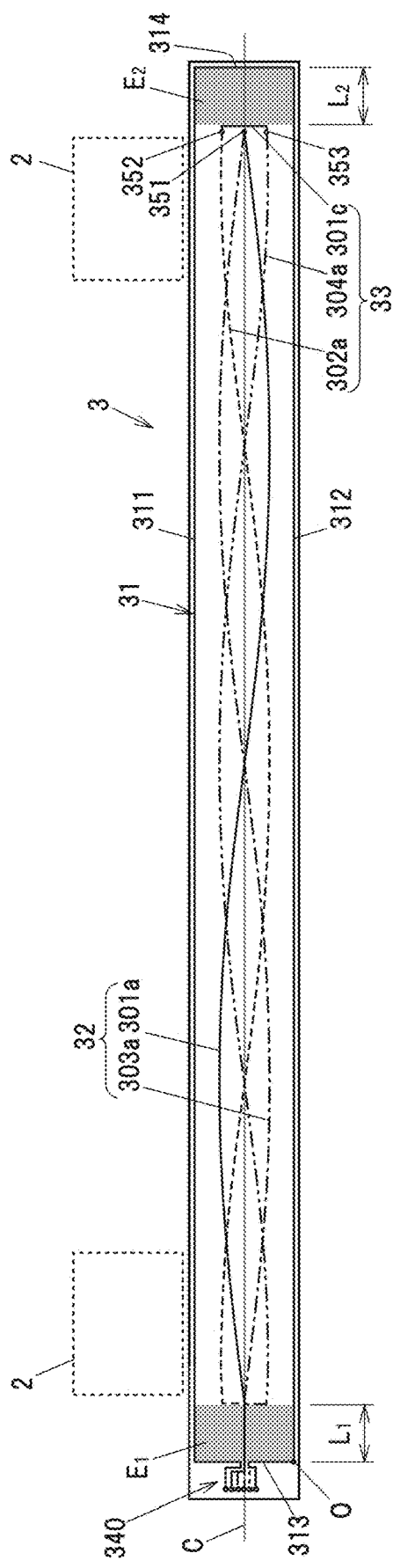

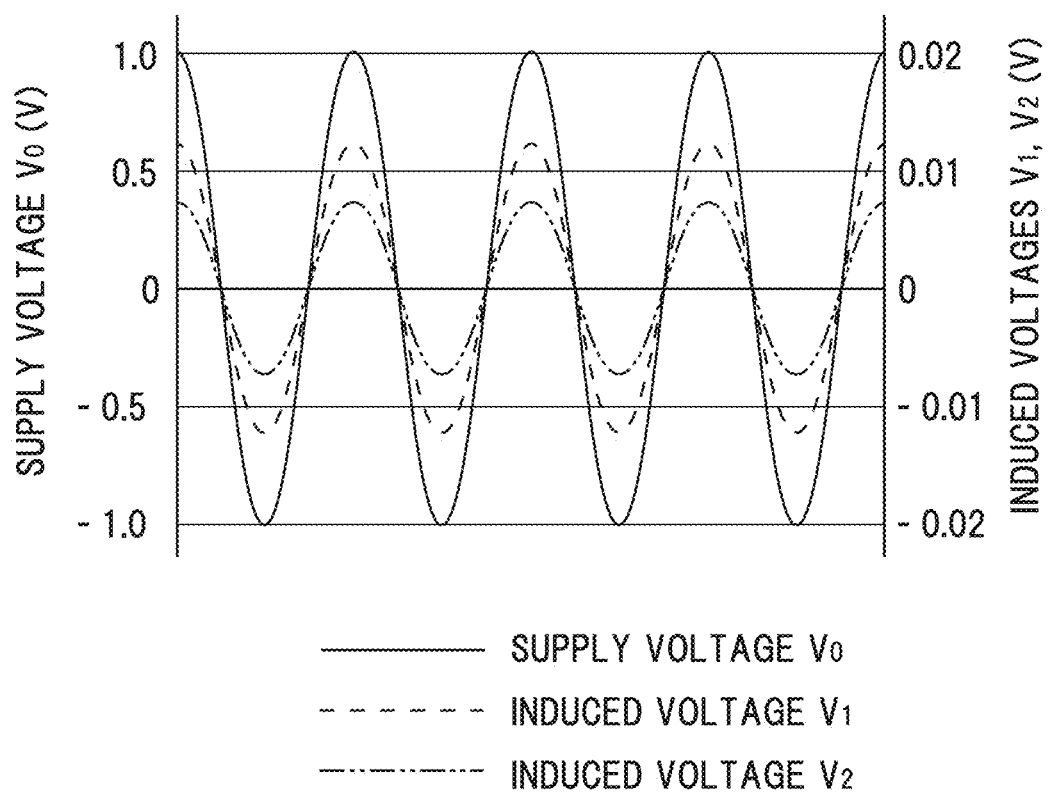

POSITION DETECTION DEVICE

CROSS-REFERENCE TO RELATED APPLICATIONS

The present patent application claims the priority of Japanese patent application No. 2022-087005 filed on May 27, 2022, and the priority of Japanese patent application No. 2023-067642 filed on Apr. 18, 2023, and the entire contents thereof are hereby incorporated by reference.

TECHNICAL FIELD

The present invention relates to a position detection device that detects the position of a shaft that moves forward and backward in the axial direction.

BACKGROUND OF THE INVENTION

Conventionally, a position detection device that detects the position of a shaft that moves forward and backward in the axial direction is being used, for example, to detect the position of a rack shaft in a steering device of a vehicle.

A detection unit described in Patent Literature 1 detects an axial position of a rack shaft of an electric power steering device and includes a DC power source, a permanent magnet, an element group composed of first to fourth magnetoresistive elements disposed between the permanent magnet and the rack shaft, and a computing section for calculating the position of the rack shaft. In the element group, a series circuit including the first and second magnetoresistive elements being connected in series, and a series circuit including the third and fourth magnetoresistive elements being connected in series are connected in parallel to form a bridge circuit. To the computing section, a potential of a first terminal connected between the first magnetoresistive element and the second magnetoresistive element and a potential of a terminal connected between the third magnetoresistive element and the fourth magnetoresistive element are input. Plural grooves extending in a direction inclined with respect to the axial direction of the rack shaft are formed on the surface of the rack shaft facing the element group.

In the detection unit configured as described above, when the rack shaft moves in the axial direction due to the rotation of the pinion gear shaft meshing with the rack shaft and the relative positions of the first to fourth magnetoresistive elements with respect to the grooves change, the electric resistance balance of the first to fourth magnetoresistive elements changes, so that the potentials of the first terminal and the second terminal change. The computing section calculates the position of the rack shaft based on changes in these potentials.

Citation List Patent Literature 1: WO2021/210125

SUMMARY OF THE INVENTION

In the detection unit disclosed in Patent Literature 1, for example, when the rack shaft moves in a forward and backward direction of a vehicle (i.e., vehicle longitudinal direction) or rotates about a central axis due to vibrations or the like caused by the running of the vehicle, the position of the first to fourth magnetoresistive elements relative to the grooves changes, and an error will occur in the detected position of the rack shaft.

To develop a position detection device with high detection accuracy, the present inventors initially conceived a position detection device that detects the position of the shaft by arranging a printed circuit board having a detection coil formed by combining a pair of sine wave conductor wires and a rectangular shape excitation coil formed to surround the detection coil to face the shaft, attaching a detection object having a higher magnetic permeability than the shaft to the shaft, generating an alternating magnetic field by the excitation coil, and measuring the magnitude of the voltage induced in the detection coil. However, this position detection device has a detection error due to the non-uniformity of the magnetic flux density inside the excitation coil. To reduce the detection error and increase the high detection accuracy, it was necessary to make the excitation coil sufficiently large with respect to the detection coil by increasing the excitation coil and the substrate in size, for example.

Accordingly, it is an object of the present invention to provide a position detection device capable of improving detection accuracy while suppressing an increase in size.

To solve the problems mentioned above, the present invention provides: a position detection device for detecting a position of a shaft moving forward and backward in an axial direction, comprising: a detection object attached to the shaft; an excitation coil for generating an alternating magnetic field; a power supply for supplying an alternating current to the excitation coil; and a detection coil arranged to be extending along an axial direction of the shaft and being interlinked with a magnetic flux of the alternating magnetic field, wherein the excitation coil is arranged to surround the detection coil, and the detection coil comprises a distorted curved portion being distorted with respect to a sine wave curve in such a manner that a peak value of a voltage induced in the detection coil changes into a sine wave shape when the shaft moves along the axial direction at a constant speed.

Effects of the Invention

According to the position detection device according to the present invention, it is possible to improve the detection accuracy while suppressing the size increase of the excitation coil.

BRIEF DESCRIPTION OF DRAWINGS

FIG. 4A is an overall view of wiring patterns formed on the first to fourth metal layers of the substrate seen through from a surface side.

FIG. 4B is a partially enlarged view of FIG. 4A.

FIG. 10 is a graph showing the relationship between a supply voltage supplied from a power supply to the excitation coil, an induced voltage induced in the sine wave shape detection coil, and an induced voltage induced in the cosine wave shape detection coil.

DETAILED DESCRIPTION OF THE INVENTION

Embodiments

Figure 1:
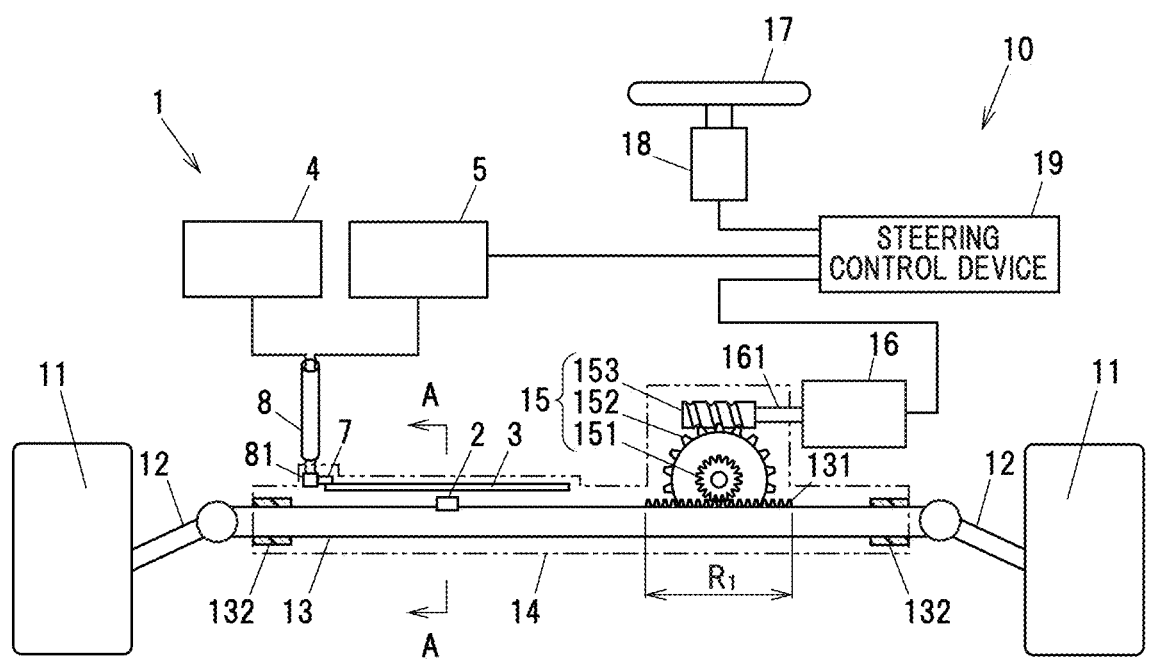
FIG. 1 is a schematic diagram of a vehicle equipped with a steer-by-wire steering device having a stroke sensor as a position detection device, according to an embodiment of the present invention.

FIG. 1 is a schematic diagram of a vehicle equipped with a steer-by-wire steering device having a stroke sensor 1 as a position detection device according to an embodiment of the present invention.

As shown in FIG. 1, the steering device 10 comprises a stroke sensor 1, tie rods 12 connected to steerable wheels 11 (left and right front wheels), a rack shaft 13 connected to the tie rods 12, a cylindrical housing 14 for accommodating the rack shaft 13, a worm reduction mechanism 15 having a pinion gear 151 meshed with a rack teeth 131 of the rack shaft 13, an electric motor 16 that imparts axial movement force to the rack shaft 13 via the worm reduction mechanism 15, a steering wheel 17 to be operated by the driver, a steering angle sensor 18 for detecting a steering angle of the steering wheel 17, and a steering control device 19 for controlling the electric motor 16 based on the steering angle detected by the steering angle sensor 18.

In FIG. 1, the housing 14 is shown in a virtual line (phantom). The rack shaft 13 is made of steel such as carbon steel, and is supported by a pair of rack bushings 132 attached to both ends of the housing 14. The worm reduction mechanism 15 has a worm wheel 152 and a worm gear 153, and the pinion gear 151 is attached to the worm wheel 152. The worm gear 153 is attached to a motor shaft 161 of the electric motor 16.

The electric motor 16 generates torque by a motor current supplied from the steering control device 19 and rotates the worm wheel 152 and the pinion gear 151 via the worm gear 153. When the pinion gear 151 rotates, the rack shaft 13 moves forward and backward in its axial direction, and the left and right steerable wheels 11 are steered. The rack shaft 13 can move rightward and leftward in a vehicle width direction within a predetermined range from a neutral position when the steering angle is zero. In FIG. 1, a double arrow indicates a range $R_1$ where the rack shaft 13 can move in the axial direction.

(Structure of Stroke Sensor 1)

The stroke sensor 1 includes a target 2 attached to the rack shaft 13, a substrate 3 facing the target 2, a power source section (power supply) 4, and a computing section 5. The substrate 3 is fixed in the housing 14 parallel to the rack shaft 13. The stroke sensor 1 detects the position of the rack shaft 13 with respect to the housing 14 based on the position of the target 2 and outputs information on the detected position to the steering control device 19. The steering control device 19 controls the electric motor 16 so that the position of the rack shaft 13 detected by the stroke sensor 1 corresponds to the steering angle of the steering wheel 17 detected by the steering angle sensor 18.

Figure 2:
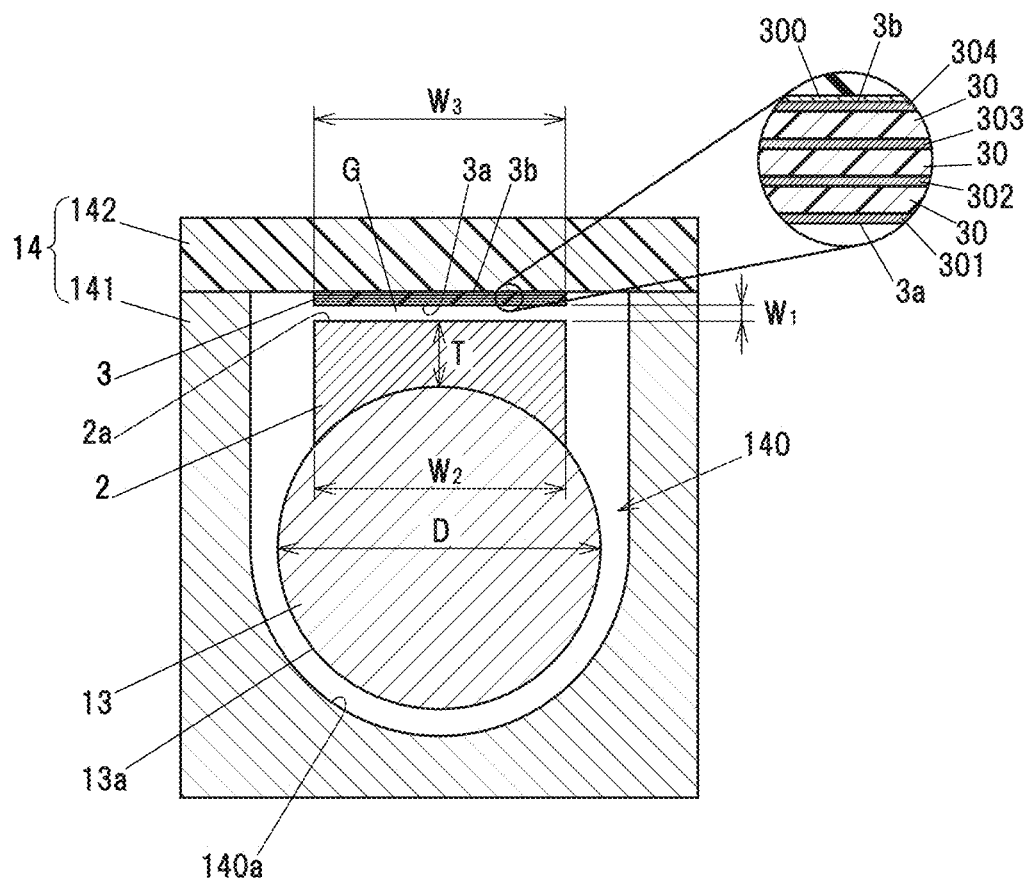
FIG. 2 is a cross-sectional view of a rack shaft, a housing, a target, and a substrate taken along line A-A of FIG. 1.
Figure 3:
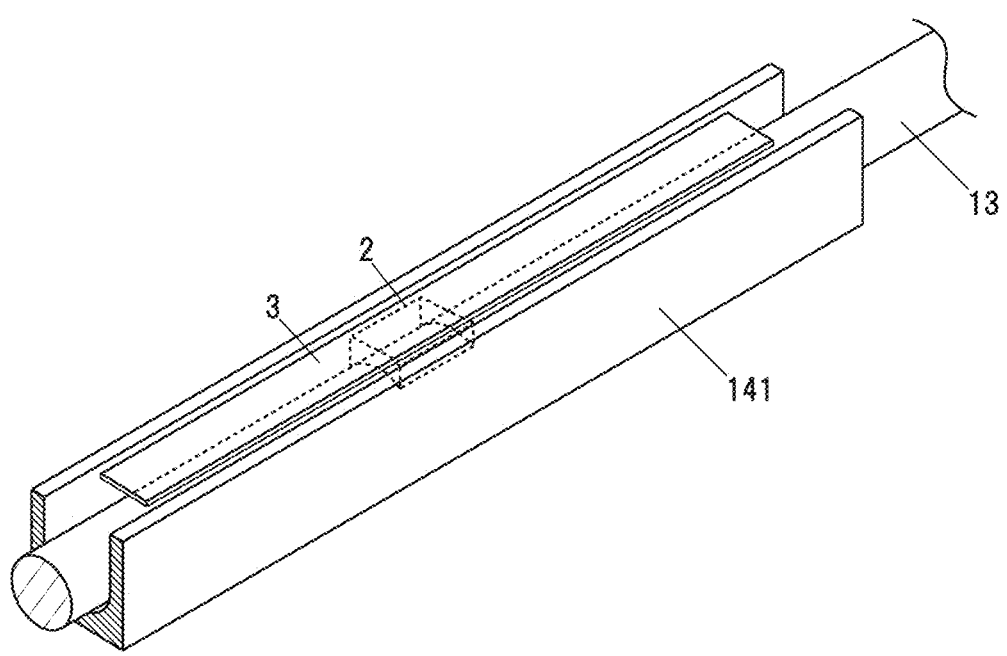
FIG. 3 is a perspective view showing the rack shaft, a main body of the housing, the target, and the substrate.
Figure 5A:
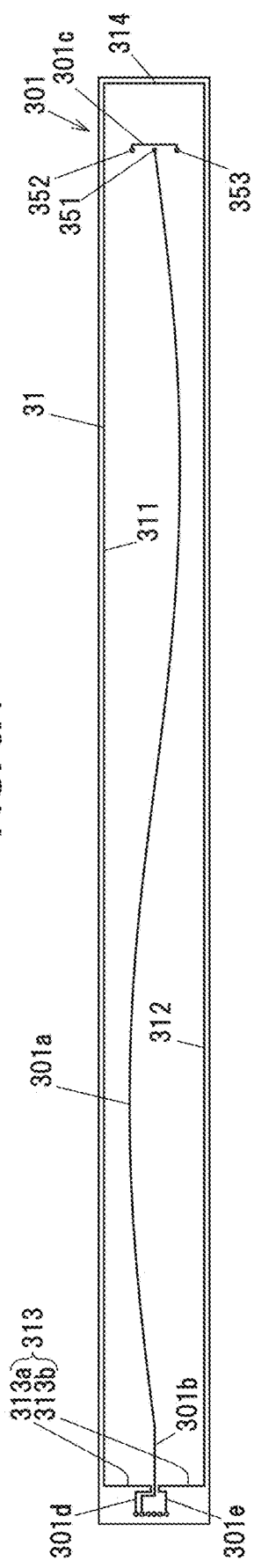
FIGS. 5A to 5D are plan views, respectively showing the first to fourth metal layers viewed from the surface side.
Figure 5B:
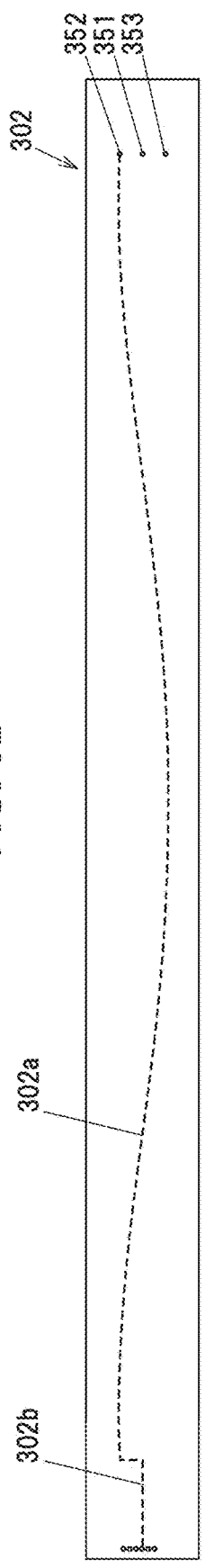
Figure 5C:
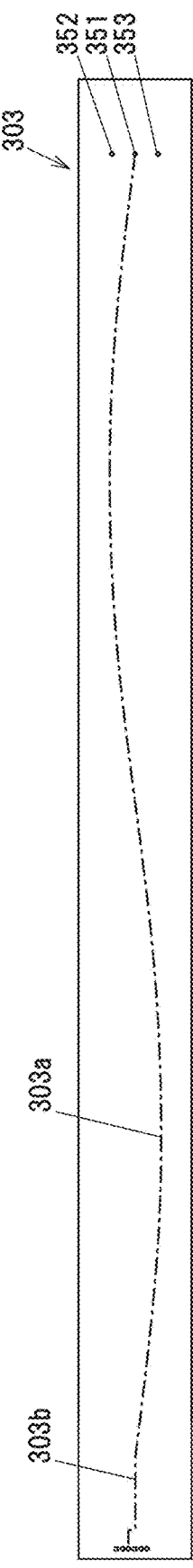
Figure 5D:
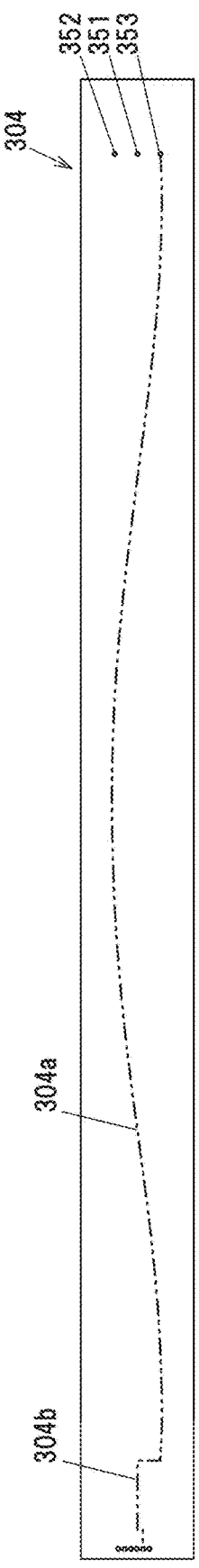

FIG. 2 is a cross-sectional view of the rack shaft 13, the housing 14, the target 2, and the substrate 3 taken along line A-A in FIG. 1. FIG. 3 is a perspective view showing the rack shaft 13, the main body 141 of the housing 14, the target 2, and the substrate 3.

The rack shaft 13 is a rod-shaped body made of steel having a circular cross-section. The housing 14 has the main body 141 made of metal and a lid 142 made of resin, and the lid 142 is attached to the main body 141 by, e.g., adhesion. The main body 141 has a U-shaped cross-section in which an accommodation space 140 for accommodating the rack shaft 13 is formed, and an accommodation space 140 opens upward in the vertical direction. A diameter D of the rack shaft 13 is, e.g., 25 mm.

A gap of, e.g., 1 mm or more is formed between an outer peripheral surface 13a of the rack shaft 13 and an inner surface 140a of the accommodation space 140. The lid 142 is formed in a flat plate shape and covers the accommodation space 140 from above in the vertical direction. The main body 141 is a non-magnetic material made of die-cast aluminum alloy, for example. The material of the lid 142 is not necessarily limited to resin, but it is desirable to use a non-magnetic and non-conductive material.

The target 2 is one aspect of a detection object (i.e., an object to be detected) of the present invention and is a target for detecting the position of the rack shaft 13. The target 2 is made of a material with a higher magnetic permeability than the rack shaft 13 or a material with a higher electrical conductivity than the rack shaft 13. When a material having a magnetic permeability higher than that of the rack shaft 13 is used for the target 2, a magnetic material such as ferrite can be used as the material. When a material having a higher conductivity than that of the rack shaft 13 is used for the target 2, a metal containing aluminum or copper as a main component, for example, can be used as the material.

In this embodiment, the target 2 is provided to protrude from an outer peripheral surface 13a of the rack shaft 13 toward the substrate 3. Therefore, even if a material with the same magnetic permeability as the material of the rack shaft 13 or a material with the same conductivity as the material of the rack shaft 13 is used as the material of the target 2, it is possible to obtain the functions and effects described later. However, in order to improve the position detection accuracy, it is desirable that a high magnetic permeability material having higher magnetic permeability than the material of the rack shaft 13 or a high conductivity material having the same conductivity as the material of the rack shaft 13 is used as the material of the target 2.

The target 2 is attached to an upper part of the rack shaft 13 by fixing means such as adhesion or welding. A facing surface 2a of the target 2 facing the substrate 3 is formed flat. The facing surface 2a of the target 2 faces a front surface 3a of the substrate 3 through an air gap G in parallel. A back surface 3b of the substrate 3 is attached to the lid 142 with an adhesive 300. The shape of the facing surface 2a viewed from a substrate 3-side is a rectangular shape whose long side direction is the axial direction of the rack shaft 13.

A width $W_1$ of the air gap G is, e.g., 1 mm. A minimum thickness T of the target 2 in a direction perpendicular to the facing surface 2a is, e.g., 5 mm. In the present embodiment, the rack shaft 13 is formed to have a circular cross-section, but the cross-section of the rack shaft 13 is not limited to a circle but may be in a D-shape in which a part is formed in a straight line or in a polygonal shape.

The substrate 3 is a four-layered substrate in which layers of a plate-shaped base material 30 made of a dielectric material such as FR4 (glass fiber impregnated with epoxy resin and heat-cured) are provided between the first to fourth metal layers 301 to 304. The thickness of each base material 30 is, e.g., 0.3 mm. Each of the first to fourth metal layers 301 to 304 has a thickness of, e.g., 18 μm. The substrate 3 has a flat rectangular shape whose longitudinal direction is the axial direction of the rack shaft 13. A width $W_3$ of the substrate 3 in the lateral direction is shorter than the diameter D of the rack shaft 13, and is, e.g., 20 mm. A width $W_2$ of the target 2 in the direction parallel to the lateral direction of the substrate 3 is equal to or wider than the width $W_3$ of the substrate 3 in the lateral direction.

FIG. 4A is an overall view of the wiring patterns formed on the first to fourth metal layers 301 to 304 of the substrate 3 as seen through from a front surface 3a-side. FIG. 4B is a partially enlarged view of FIG. 4A. FIGS. 5A to 5D are plan views showing the first to fourth metal layers 301 to 304, respectively, viewed from the front surface 3a-side. The wiring patterns shown in FIGS. 4A and 4B and FIGS. 5A to 5D are merely examples, and various wiring patterns may be used as long as the substrate 3 is formed so as to obtain the effects of the present invention.

In FIGS. 4A and 4B and FIGS. 5A to 5D, the wiring pattern of the first metal layer 301 is indicated by solid lines, the wiring pattern of the second metal layer 302 is indicated by broken lines, the third metal layer 302 is indicated by broken lines, the wiring pattern of the metal layer 303 is indicated by a one-dot chain line, and the wiring pattern of the fourth metal layer 304 is indicated by a two-dot chain line. In FIG. 4A, the substrate 3 is bisected in the lateral direction and the central axis C extending in the longitudinal direction is indicated by a gray straight line, and the dotted lines indicate the positions of the target 2 when the rack shaft 13 is positioned at one end and the other end of the range in which the stroke sensor 1 can detect the absolute position of the rack shaft 13. As shown in FIG. 2, the substrate 3 and the target 2 overlap in the radial direction of the rack shaft 13. However, in FIG. 4A, the position of the target 2 with respect to the substrate 3 is shifted in the lateral direction for the purpose of illustration.

A connector portion 340 having first to sixth through-holes 341 to 346 through which connector pins of the connector 7 indicated by two-dot chain lines in FIG. 4B is provided at one end of the substrate 3 in the longitudinal direction. The first to sixth through-holes 341 to 346 are arranged linearly along the lateral direction of the substrate 3. The connector 7 is connected with a connector 81 (see FIG. 1) of the cable 8 for connection with the power source section 4 and the computing section κ. Further, the substrate 3 is formed with first to third vias 351 to 353 for connecting the wiring patterns between layers.

The first metal layer 301 includes a first curved portion 301a, a first connector-connecting portion 301b connecting one end of the first curved portion 301a to a second through-hole 342, and an end-connecting portion 301c connecting respective ends of the curved portion 302a to be described later and a fourth curved portion 304a. The second metal layer 302 includes a second curved portion 302a, and a second connector-connecting portion 302b connecting one end of the second curved portion 302a to a fourth through-hole 344. The third metal layer 303 includes a third curved portion 303a, and a third connector-connecting portion 303b connecting one end of the third curved portion 303a to a third through-hole 343. The fourth metal layer 304 includes a fourth curved portion 304a, and a fourth connector-connecting portion 304b connecting one end of the fourth curved portion 304a to a fifth through-hole 345.

The other ends of the first curved portion 301a and the third curved portion 303a are connected to each other by a first via 351. One end of the end-connecting portion 301c is connected to the other end of the second curved portion 302a by a second via 352, and the other end of the end-connecting portion 301c is connected to the other end of the fourth curved portion 304a by a third via 353.

The first to fourth curved portions 301a, 302a, 303a, and 304a are curved in a substantially sine wave shape. The first curved portion 301a and the third curved portion 303a, and the second curved portion 302a and the fourth curved portion 304a are symmetrical with respect to the central axis C of the substrate 3.

The substrate 3 includes an excitation coil 31 that generates an alternating magnetic field, and two detection coils 32 and 33 with which the magnetic flux of the magnetic field generated by the excitation coil 31 interlinks. A sine wave AC current is supplied from the power source section 4 to the excitation coil 31. Of the two detection coils 32 and 33, one detection coil 32 is formed by the first curved portion 301a and the third curved portion 303a, and the other detection coil 33 is formed by the second curved portion 302a, the fourth curved portion 304a, and the end-connecting portion 301c.

The excitation coil 31 has a rectangular shape having a pair of long side portions 311 and 312 extending in the axial direction of the rack shaft 13 and a pair of short side portions 313 and 314 between the pair of long side portions 311 and 312, and is arranged to surround the detection coils 32 and 33. In this embodiment, the long side portions 311 and 312 and the short side portions 313 and 314 are formed as wiring patterns on the first metal layer 301. Of the pair of short side portions 313 and 314, the short side portion 313 on the side of the connector portion 340 is composed of two straight portions 313a and 313b sandwiching the first to fourth connector connection portions 301b, 302b, 303b and 304b. The ends of the two straight portions 313a and 313b are connected to the first through-hole 341 and the sixth through-hole 346 by connector-connecting portions 301d and 301e formed in the first metal layer 301, respectively.

The excitation coil 31 may be formed not only on the first metal layer 301 but also on any of the second to fourth metal layers 302 to 304 or may be formed over a plurality of layers. Also, an excitation coil may be formed separately from the substrate 3.

An induced voltage is generated in the detection coils 32 and 33 by interlinking the magnetic flux of the magnetic field generated by the excitation coil 31. When the target 2 is made of a material with a higher magnetic permeability than the rack shaft 13, the magnetic flux flows intensively in the target 2, and the magnetic flux density in the portion of the substrate 3 facing the target 2 becomes higher than that in other portions. Further, when the target 2 is made of a material having a higher conductivity than the rack shaft 13, the eddy current generated in the target 2 by the AC magnetic field reduces the density of the magnetic flux interlinking the detection coils 32 and 33. As a result, the magnetic flux density in the portion of the substrate 3 facing the target 2 becomes lower than that in the other portions. Therefore, the magnitude of the voltage induced in the detection coils 32 and 33 changes according to the position of the target 2 with respect to the substrate 3. When a material having a higher magnetic permeability than that of the rack shaft 13 is used as the material of the target 2, it is desirable to use a magnetic material that has a high electric resistance and does not easily generate an eddy current.

In this embodiment, a length of the target 2 in the axial direction of the rack shaft 13 is shorter than half the length of detection coils 32 and 33 in the longitudinal direction of the substrate 3. A voltage having the same cycle as the alternating current supplied from the power source section 4 to the excitation coil 31 is induced in the detection coils 32 and 33, and the peak value of the induced voltage changes according to the position of the target 2. Here, the peak value of the voltage means the maximum absolute value of the voltage within a period of one cycle of the alternating current supplied to the excitation coil 31.

The phases of the voltages induced in the detection coils 32 and 33 are different from each other while the rack shaft 13 moves from one movement end in the axial direction to the other movement end in the axial direction. In this embodiment, the phases of the voltages induced in the detection coils 32 and 33 differ by 90°. Hereinafter, of the two detection coils 32 and 33, one detection coil 32 is referred to as a sine wave shape detection coil 32, and the other detection coil 33 is referred to as a cosine wave shape detection coil 33.

The peak value of the voltage induced in the sine wave shape detection coil 32 and the cosine wave shape detection coil 33 due to the interlinking of the magnetic flux of the target 2 changes within the range of one cycle or less while the rack shaft 13 moves one movement end to the other movement end in the axial direction. Thereby, the stroke sensor 1 can detect the absolute position of the rack shaft 13 over the entire range $R_1$ in which the rack shaft 13 can move in the axial direction.

As shown in FIG. 4A, between respective ones of the pair of short side portions 313 and 314 of the excitation coil 31, the sine wave shape detection coil 32, and the cosine wave shape detection coil 33, there are provided first and second buffer regions $E_1$, $E_2$ for suppressing voltages induced in the sine wave shape detection coil 32 and the cosine wave shape detection coil 33 by the magnetic flux generated by the current flowing through the short side portions 313 and 314. In the example shown in FIG. 4A, a length $L_1$ of the first buffer region $E_1$ and a length $L_2$ of the second buffer region $E_2$ in the longitudinal direction of the substrate 3 are the same, but $L_1$ and $L_2$ may be different from each other.

By the way, the magnetic flux density inside the excitation coil 31 generated by the alternating current supplied from the power source section 4 is not uniform and varies depending on the part. This non-uniformity in magnetic flux density causes an error in detecting the position of the rack shaft 13. Hereinafter, the magnetic flux density inside the excitation coil 31 will be described, and the respective shapes of the sine wave shape detection coil 32 and the cosine wave shape detection coil 33 for reducing the detection error caused by the non-uniformity of the magnetic flux density, and this effect of reducing the detection error due to the shapes will be described.

Figure 6A:
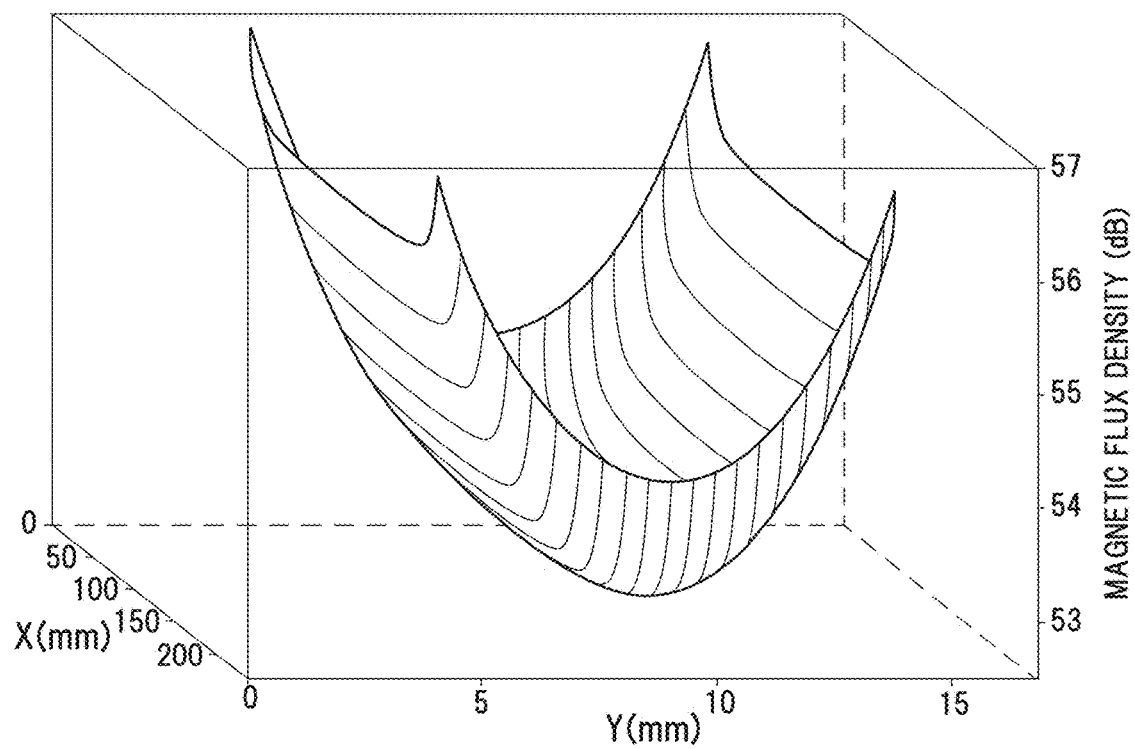
FIG. 6A is a graph showing the distribution of magnetic flux density inside an excitation coil in a substrate.
Figure 6B:
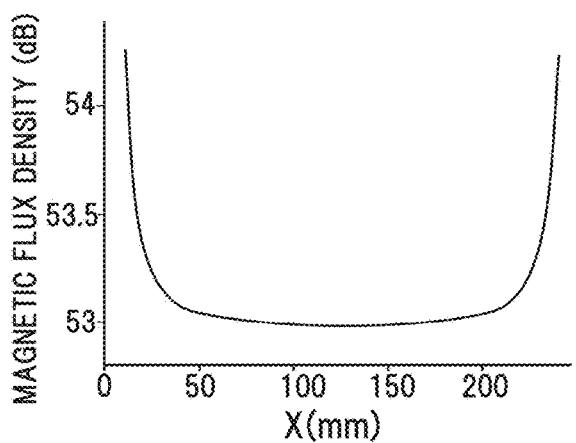
FIG. 6B is a graph showing the distribution of magnetic flux density in a longitudinal direction along the central axis of the substrate.
Figure 6C:
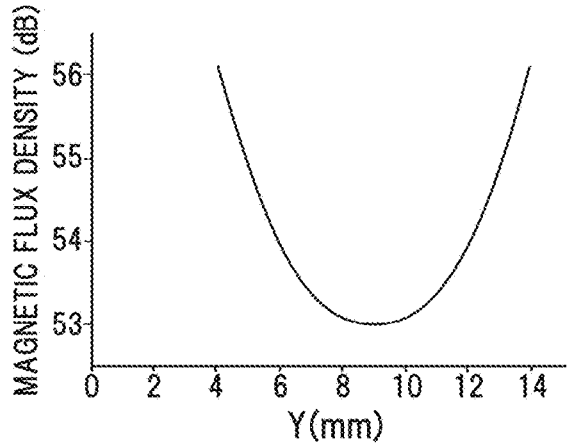
FIG. 6C is a graph showing the distribution of the magnetic flux density in a lateral direction at a central portion in the longitudinal direction of the substrate.

FIG. 6A is a graph showing the distribution of the magnetic flux density inside the excitation coil 31 on the substrate 3. FIG. 6B is a graph showing the distribution of the magnetic flux density in the longitudinal direction along the central axis C of the substrate 3. FIG. 6C is a graph showing the distribution of the magnetic flux density in the lateral direction at a central portion of the substrate 3 in the longitudinal direction. In FIGS. 6A to 6C, the magnetic flux density is shown in decibels (dB) on the vertical axis. In FIGS. 6A to 6C and FIGS. 7 and 8, which will be described later, the point O in FIG. 4A is shown as an origin, the position of the target 2 in the lateral direction is indicated by Y (mm), the maximum value of X (the length of the long side portions 311 and 312 of the excitation coil 31) is 250 mm, and the maximum value of Y (the length of the short side portions 313 and 314 of the excitation coil 31) is 18 mm. The point O is an intersection point between the long side portion 312 and the short side portion 313 of the excitation coil 31.

As shown in FIGS. 6A to 6C, inside the excitation coil 31, the magnetic flux density is high near the long side portions 311 and 312 and the short side portions 313 and 314, and the magnetic flux density is lowered toward the center of the excitation coil 31.

Figure 7:
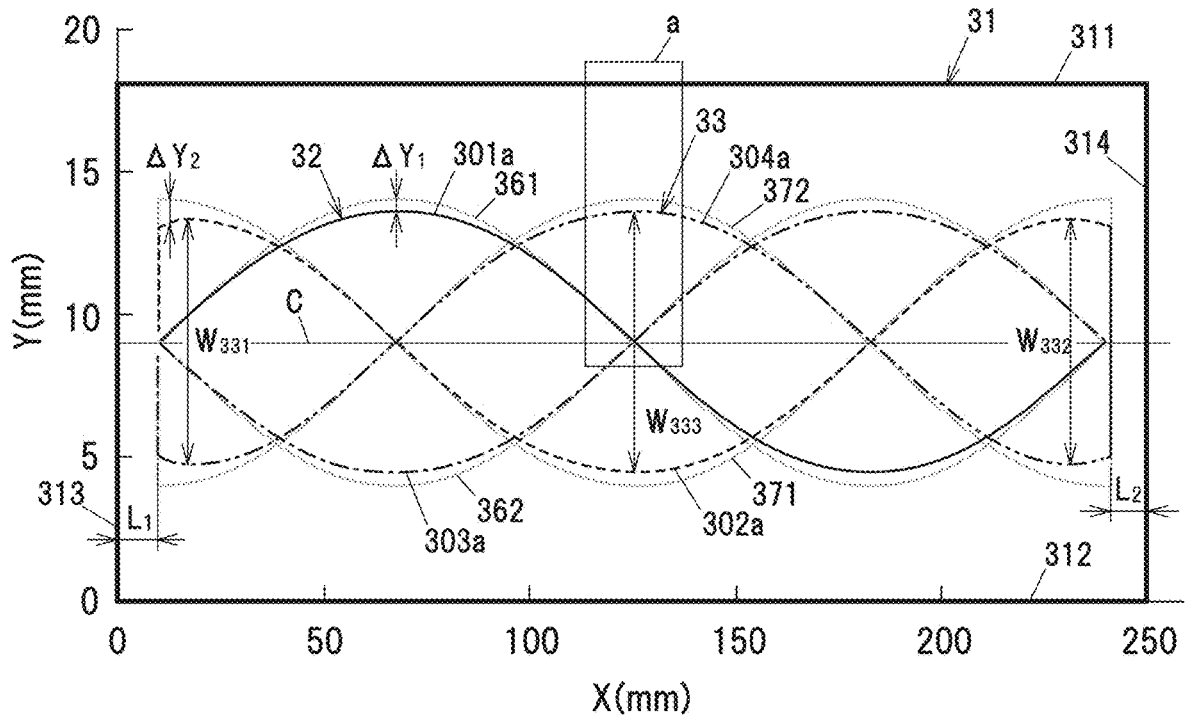
FIG. 7 is a schematic diagram schematically showing the shapes of sine wave shape detection coils and cosine wave shape detection coils according to the present embodiment, with different scales in the longitudinal and lateral directions of the substrate.

FIG. 7 is a schematic diagram schematically showing the shapes of the sine wave shape detection coil 32 and the cosine wave shape detection coil 33 according to the present embodiment with different scales in the longitudinal direction and the lateral direction of the substrate 3. The first curved portion 301*a* and the third curved portion 303*a*, which constitute the sine wave shape detection coil 32, have distortion shapes distorted with respect to a sine wave curve so that the peak value of the voltage induced in the sine wave shape detection coil 32 changes into a sine wave shape when the rack shaft 13 moves at a constant speed along the axial direction. Further, the second curved portion 302*a* and the fourth curved portion 304*a*, which constitute the cosine wave shape detection coil 33, have distortion shapes distorted with respect to the sine wave curve so that the peak value of the voltage induced in the cosine wave shape detection coil 33 changes into a sine wave that is 90° out of phase (cosine wave) with the voltage induced in the sine wave shape detection coil 32 when the rack shaft 13 moves along the axial direction at a constant speed.

Figure 8:
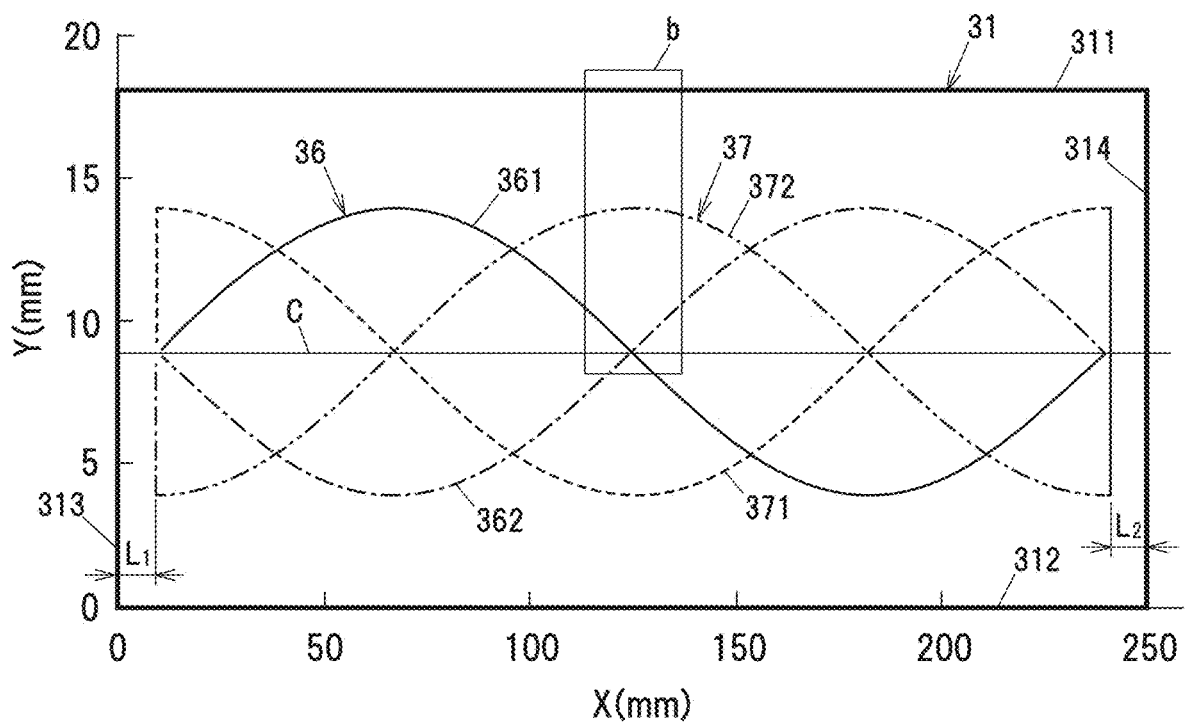
FIG. 8 is a schematic diagram showing the shapes of normal sine wave shape detection coils and normal cosine wave shape detection coils as a comparative example.

FIG. 8 is a schematic diagram showing the shapes of a normal sine wave shape detection coil 36 and a normal cosine wave shape detection coil 37 shown as a comparative example. The normal sine wave shape detection coil 36 is composed of a pair of curved portions 361 and 362 in undistorted sine wave shapes. The normal cosine wave shape detection coil 37 is composed of a pair of curved portions 371 and 372 in undistorted sine wave shapes that are 90° out of phase with the pair of curved portions 361 and 362 of the normal sine wave shape detection coil 36. In FIGS. 7 and 8, $L_1$ and $L_2$ are 10 mm, respectively.

In FIG. 7, the shapes of the curved portions 361 and 362 of the normal sine wave shape detection coil 36 and the shapes of the curved portions 371 and 372 of the normal cosine wave shape detection coil 37 are shown as gray curves with overlapping the sine wave shape detection coil 32 and the cosine wave shape detection coil 33. A dimensional difference $\Delta Y_1$ between the shape of the sine wave shape detection coil 32 and the shape of the normal sine wave shape detection coil 36 in the lateral direction of the substrate 3 is the amount of distortion of the sine wave shape detection coil 32 with respect to the sine wave curve. A dimensional difference $\Delta Y_2$ between the shape of the cosine wave shape detection coil 33 and the shape of the normal cosine wave shape detection coil 37 in the lateral direction of the substrate 3 is the amount of distortion of the cosine wave shape detection coil 33 with respect to the sine wave curve. The amounts of distortion of the sine wave shape detection coil 32 and the cosine wave shape detection coil 33 increases as the position closer to the excitation coil 31 in both the longitudinal direction and the lateral direction of the substrate 3.

As shown in FIG. 7, the sine wave shape detection coil 32 has a minimum coil width near both end portions and near the central portion in the long side direction of the excitation coil 31. The cosine wave shape detection coil 33 has a maximum coil width near both end portions and near the central portion in the long side direction of the excitation coil 31. Here, the coil width of the sine wave shape detection coil 32 is the distance between the first curved portion 301a and the third curved portion 303a in the short side direction of the excitation coil 31. The coil width of the cosine wave shape detection coil 33 is the distance between the second curved portion 302a and the fourth curved portion 304a in the short side direction of the excitation coil 31.

Further, as shown in FIG. 7, maximum values $W_{331}$ and $W_{332}$ of the coil width of the cosine wave shape detection coil 33 near both end portions in the long side direction of the excitation coil 31 are smaller than a maximum value $W_{333}$ of the coil width of the cosine wave shape detection coil 33 in the vicinity at the central portion of the excitation coil 31 in the long side direction. This is because the cosine wave shape detection coil 33 is close to the short side portions 313 and 314 of the excitation coil 31 near both ends in the long side direction of the excitation coil 31. The maximum value $W_{333}$ of the coil width of the cosine wave shape detection coil 33 is, e.g., 10 mm.

Figure 9A:
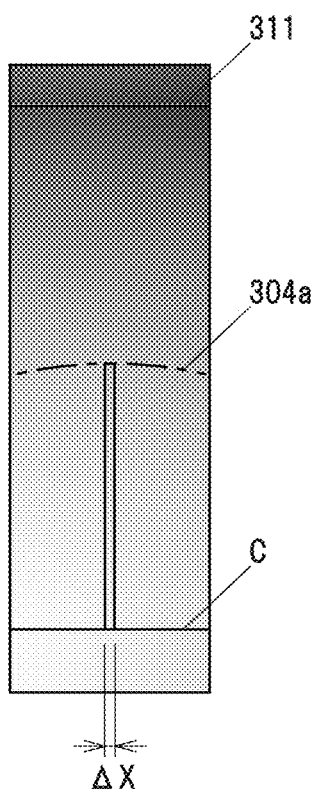
FIG. 9A is an enlarged view of the portion a of FIG. 7.
Figure 9B:
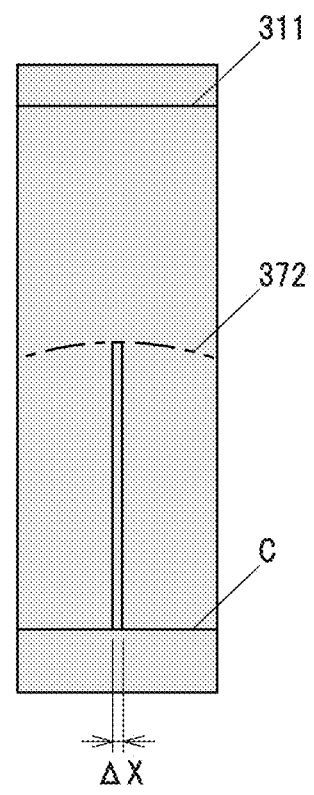
FIG. 9B is an enlarged view of the portion b of FIG. 8.

Next, a method for setting the shapes of the sine wave shape detection coil 32 and the cosine wave shape detection coil 33 will be described with reference to FIGS. 9A and 9B. FIG. 9A is an enlarged view showing the periphery of the fourth curved portion 304a in the portion a of FIG. 7, and FIG. 9B is an enlarged view showing the periphery of the curved portion 372 in the portion b of FIG. 8. Further, in FIG. 9A, the magnetic flux density generated by the current flowing through the excitation coil 31 is represented by the shade of color, and the darker the color, the higher the magnetic flux density. FIG. 9B shows the case where the magnetic flux density is uniform. It is assumed that the magnetic flux density at the central portion of the excitation coil 31 is the same between FIGS. 9A and 9B. That is, in FIG. 9A, the magnetic flux density increases from the central portion of the excitation coil 31 to the long side portion 311 of the excitation coil 31, and FIG. 9B shows a case where the magnetic flux density is constant from the central portion of the excitation coil 31 to the long side portion 311 of the excitation coil 31.

In this example, a minute section $\Delta X$ in the lateral direction of the excitation coil 31 is assumed, and the position of the fourth curved portion 304a in the minute section $\Delta X$ is determined in such a manner that the integrated value of the magnetic flux density from the central axis C to the fourth curved portion 304a in this minute section $\Delta X$ should be the same as the integrated value from the central axis C to the curved portion 372 when the density is uniform. This arithmetic processing is performed for each minute period in the long side direction of the excitation coil 31 to determine the shape of the fourth curved portion 304a. Further, similar arithmetic processing is performed for the first to third curve portions 301a, 302a, and 303a, and the shapes of the sine wave shape detection coil 32 and the cosine wave shape detection coil 33 are set.

In other words, when respective shapes of the curved portions 361, 362 of the normal sine wave shape detection coil 36 are $y_1(x)$ and $y_2(x)$ which are functions of x, respective shapes of the first curved portions 301a and the third curved portion 303a of the sine wave shape detection coil 32 are $z_1(x)$ and $z_2(x)$, which are functions of x, the magnetic flux density when the magnetic flux density is uniform is $B_S$, and the actual magnetic flux density inside the excitation coil 31 is B (B varies depending on the position (y) in the lateral direction of the excitation coil 31), the shape of the sine wave shape detection coil 32 is determined by searching $z_1(x)$, $z_2(x)$ for which the value of $D_S$ obtained by the following Formula [1] becomes sufficiently small.

Formula 1

$$D_S = \left| \int_{y_2(x)}^{y_1(x)} B_S dy - \int_{z_2(x)}^{z_1(x)} B dy \right| \qquad [1]$$

Further, when respective shapes of the curved portions 371, 372 of the normal cosine wave shape detection coil 37 are $y_3(x)$ and $y_4(x)$ which are functions of x, and respective shapes of the second curved portions 302a and the fourth curved portion 304a of the cosine wave shape detection coil 33 are $z_3(x)$ and $z_4(x)$, which are functions of x, the shape of the cosine wave shape detection coil 33 is determined by searching $z_3(x)$, $z_4(x)$ for which the value of $D_C$ obtained by the following Formula [2] becomes sufficiently small.

Formula 2

$$D_c = \left| \int_{y_4(x)}^{y_3(x)} B_S dy - \int_{z_4(x)}^{z_3(x)} B dy \right| \qquad [2]$$

Here, $z_1(x)$, $z_2(x)$, $z_3(x)$, and $z_4(x)$ may be derived from Formula [1] and Formula [2] by arithmetic operations with $D_S$, $D_C$=0. Further, since the first curved portion 301a and the third curved portion 303a have symmetrical shapes, if the shape of either the first curved portion 301a or the third curved portion 303a is set, the set shape can be reversed to set the shape of the other. Similarly, if the shape of either the second curved portion 302a or the fourth curved portion 304a is set, the set shape can be reversed to set the shape of the other.

(Operation of Stroke Sensor 1)

Next, the operation and effects of the stroke sensor 1 for detecting the position of the target 2 with respect to the substrate 3 will be described with reference to FIGS. 10 to 14. In the following description, the position of the target 2 means the central position of the target 2 in the longitudinal direction of the substrate 3.

FIG. 10 is a graph showing the relationship between a supply voltage $V_0$ supplied from the power source section 4 to the excitation coil 31, an induced voltage $V_1$ induced in the sine wave shape detection coil 32, and an induced voltage $V_2$ induced in the cosine wave shape detection coil 33, when the target 2 is located near the position of X=50 mm in the longitudinal direction of the substrate 3. The horizontal axis of the graph in FIG. is the time axis, and the left and right vertical axes indicate the supply voltage $V_0$ and the induced voltages $V_1$ and $V_2$.

In the example shown in FIG. 10, the supply voltage $V_0$ supplied to the excitation coil 31 and the induced voltages $V_1$ and $V_2$ induced in the sine wave shape detection coil 32 and the cosine wave shape detection coil 33 are in phase. However, when the position of the target 2 in the longitudinal direction of the substrate 3 is shifted to the right of X=125 mm in FIG. 7, the induced voltage $V_1$ induced in the sine wave shape detection coil 32 and the supply voltage $V_0$ supplied to the excitation coil 31 are in reverse phase. In addition, the same phase and the opposite phase of the induced voltage $V_2$ induced in the cosine wave shape detection coil 33 switches each time the target 2 passes the position where the second curved portion 302a and the fourth curved portion 304a are crossing. A high-frequency AC voltage of, e.g., about 1 MHz to 1 GHz is supplied to the excitation coil 31 as a supply voltage $V_0$.

Figure 11:
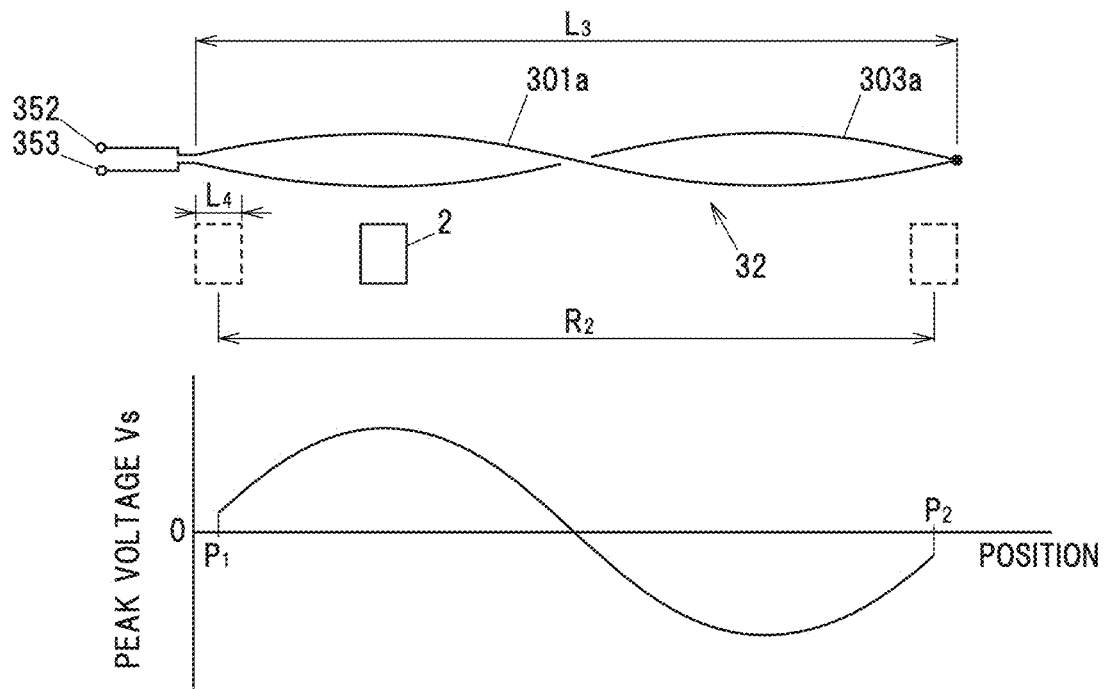
FIG. 11 is an explanatory diagram schematically showing the relationship between a peak voltage, which is a peak value of the induced voltage induced in the sine wave shape detection coil, and the position of the target.
Figure 12:
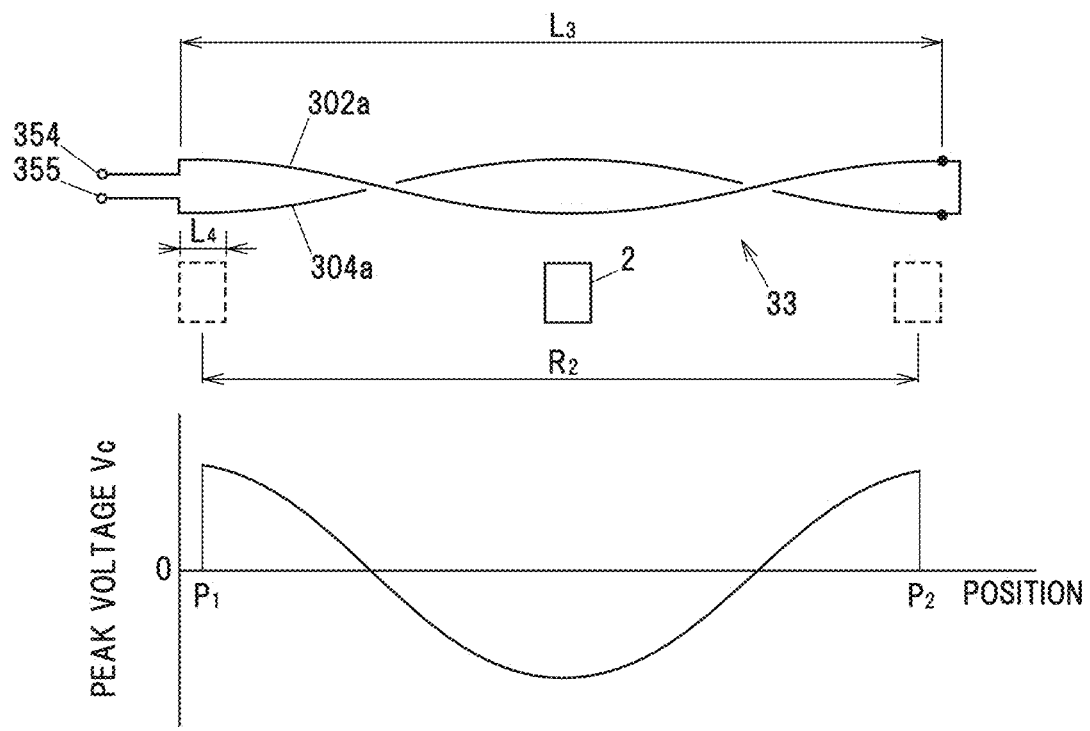
FIG. 12 is an explanatory diagram schematically showing the relationship between a peak voltage, which is a peak value of the induced voltage induced in the cosine wave shape detection coil, and the position of the target.

FIG. 11 is an explanatory diagram schematically showing the relationship between the peak voltage $V_S$, which is the peak value of the induced voltage $V_1$ induced in the sine wave shape detection coil 32, and the position of the target 2. FIG. 12 is an explanatory diagram schematically showing the relationship between the peak voltage $V_C$, which is the peak value of the induced voltage $V_2$ induced in the cosine wave shape detection coil 33, and the position of the target 2. In the graphs of the peak voltages $V_S$ and $V_C$ shown in FIGS. 11 and 12, the horizontal axis indicates the position of the target 2.

The stroke sensor 1 can detect an absolute position of the target 2 within an axial range $R_2$ in which the length $L_4$ of the target 2 in the longitudinal direction of the substrate 3 is subtracted from the length $L_3$ of the sine wave shape detection coil 32 and the cosine wave shape detection coil 33 in the longitudinal direction of the substrate 3. In the graphs shown in FIGS. 11 and 12, the peak voltages $V_S$ and $V_C$ at are shown at positions where the horizontal axis coordinate when the target 2 is at one end (the end on the side of the connector portion 340) of the axial range $R_2$ is $P_1$, and the horizontal axis coordinate when the target 2 is at the other end of the axial range $R_2$ is $P_2$.

Further, in the graphs shown in FIGS. 11 and 12, the peak voltage $V_S$ of the sine wave shape detection coil 32 has a positive value when the induced voltage $V_1$ induced in the sine wave shape detection coil 32 is in phase with the supply voltage $V_0$ supplied to the excitation coil 31 and has a negative value when the phase is opposite. Similarly, the peak voltage $V_C$ of the cosine wave shape detection coil 33 has a positive value when the induced voltage $V_2$ induced in the cosine wave shape detection coil 33 is in phase with the supply voltage $V_0$ supplied to the excitation coil 31, and has a negative value when the phase is opposite.

Here, if $\omega x$ is defined as in Formula [3], the peak voltages $V_S$ and $V_C$ are obtained by Formula [4] and Formula [5], where Xp is the coordinate value of the horizontal axis of the target 2 in the graph shown in FIG. 7. Note that A in Formula [4] and Formula [5] is a predetermined constant.

Formula 3
$$\omega_x = \frac{2\pi}{L_3} \quad [3]$$

Formula 4
$$V_S = A\sin\{\omega_x(X_p - L_1)\} \quad [4]$$

Formula 5
$$V_C = A\cos\{\omega_x(X_p - L_1)\} \quad [5]$$

From Formula [4] and Formula [5], the coordinate value Xp of the target 2 in the graphs shown in FIGS. 11 and 12 is obtained by Formula [6]. That is, the computing section κ can calculate the position of the target 2 based on the peak voltages Vs and Vc.

Formula 6
$$X_p = \frac{\arctan\left(\frac{V_S}{V_C}\right)}{\omega_x} + L_1 \quad [6]$$

Figure 13:
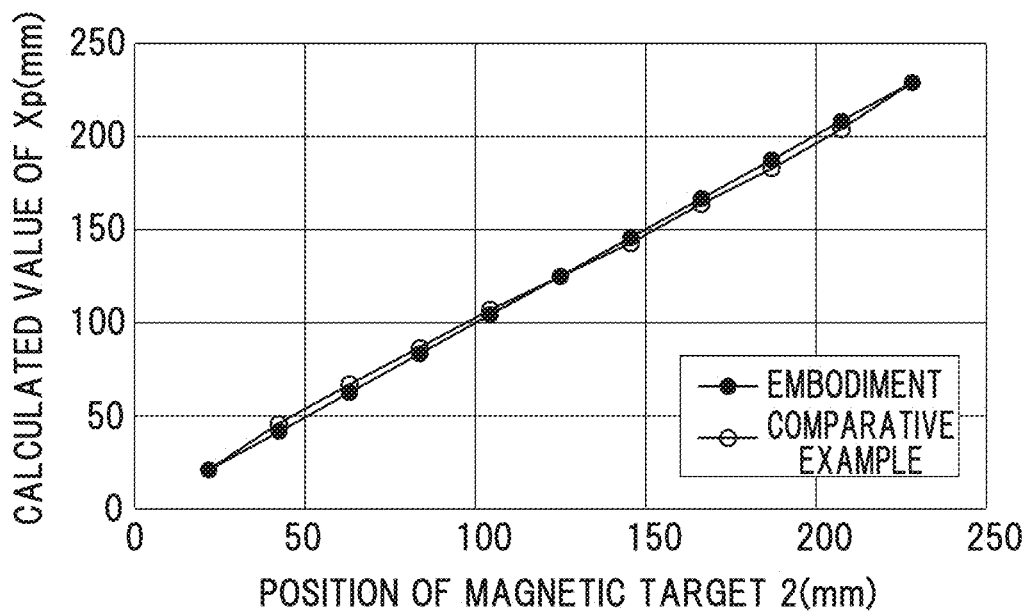
FIG. 13 is a graph showing the results of the evaluation of target position detection accuracy.
Figure 14:
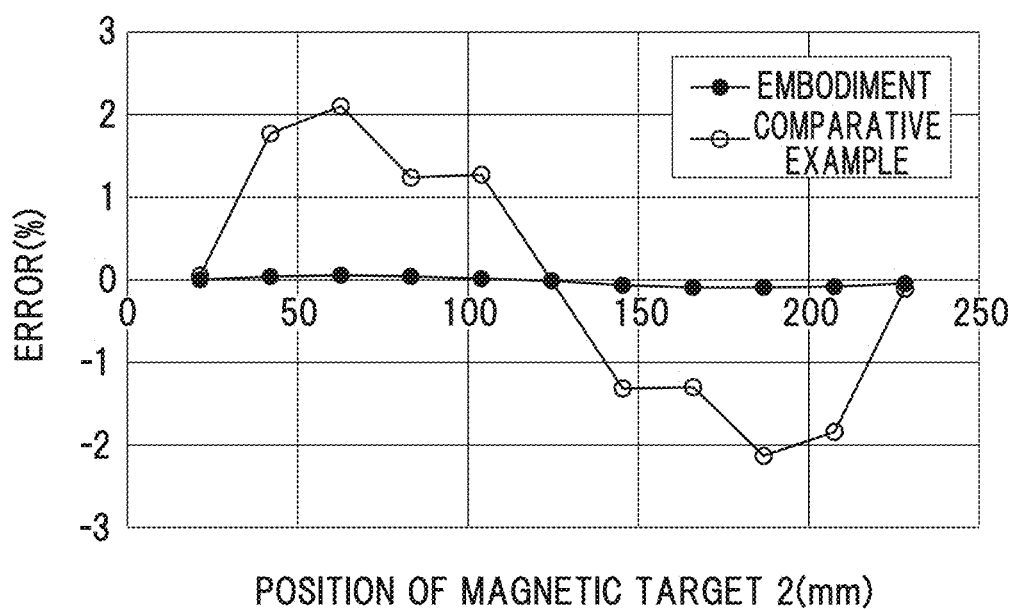
FIG. 14 is a graph showing the results of the evaluation of target position detection errors.

FIGS. 13 and 14 are graphs showing the result of evaluating the position detection accuracy of the target 2 using electromagnetic field simulation in the case of using the sine wave shape detection coil 32 and the cosine wave shape detection coil 33 having the shapes shown in FIG. 7 and in the case of using the normal sine wave shape detection coil 36 and the normal cosine wave shape detection coil 37 having the shapes shown in FIG. 8. In the graphs of FIGS. 13 and 14, the horizontal axis indicates the actual position of the target 2. The vertical axis of the graph in FIG. 13 indicates the position of the target 2 based on the above calculation results. The vertical axis of the graph in FIG. 14 indicates the ratio of detection error of the position of the target 2 to the total length of the axial range $R_2$ in which the position of the target 2 can be detected.

As shown in FIGS. 13 and 14, when the sine wave shape detection coil 32 and the cosine wave shape detection coil 33 of the present embodiment shown in FIG. 7 are used, the position of the target 2 can be detected with higher accuracy than when the normal sine wave shape detection coil 36 and the normal cosine wave shape detection coil 37 in the comparative example shown in FIG. 8 are used. In the graph shown in FIG. 14 when the sine wave shape detection coil 32 and the cosine wave shape detection coil 33 of the present embodiment are used, the maximum value of the ratio of detection error in the positive direction is 0.05%, and the maximum value of the ratio of detection error in the negative direction is −0.10%. That is, in this embodiment, the magnitude of the detection error is suppressed to 0.10% or less.
(Functions and Effects of the Embodiment)

As described above, the stroke sensor 1 according to the present embodiment can detect the position of the rack shaft 13 with high accuracy. Further, in the stroke sensor 1 according to the present embodiment, by using the sine wave shape detection coil 32 and the cosine wave shape detection coil 33 having the first to fourth curved portions 301a, 302a, 303a, and 304a of distorted shapes that are distorted with respect to the sine wave curve so as to suppress the influence of non-uniformity of the magnetic flux density inside the excitation coil 31, it is possible to increase the detection accuracy while suppressing the size increase of the excitation coil 31.

(Modified Examples of Sine Wave Shape Detection Coil 32 and Cosine Wave Shape Detection Coil 33)

Figure 15:
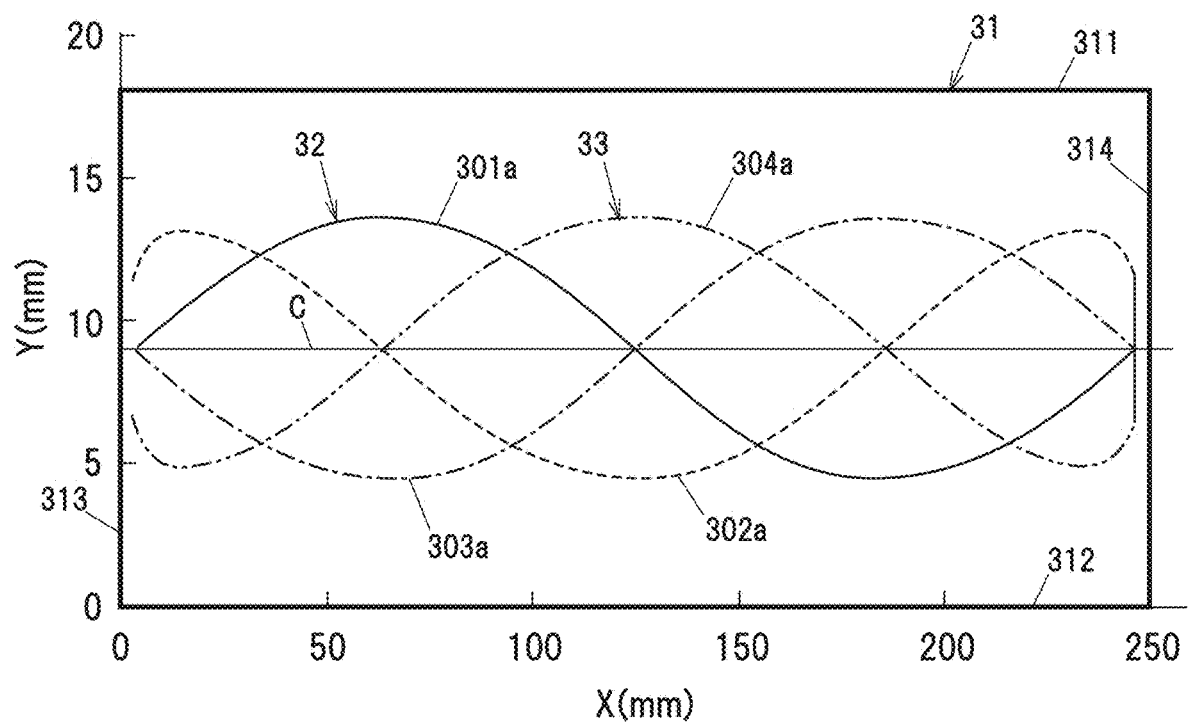
FIG. 15 is a schematic diagram showing shapes of sine wave shape detection coils and cosine wave shape detection coils according to one modified example.
Figure 16:
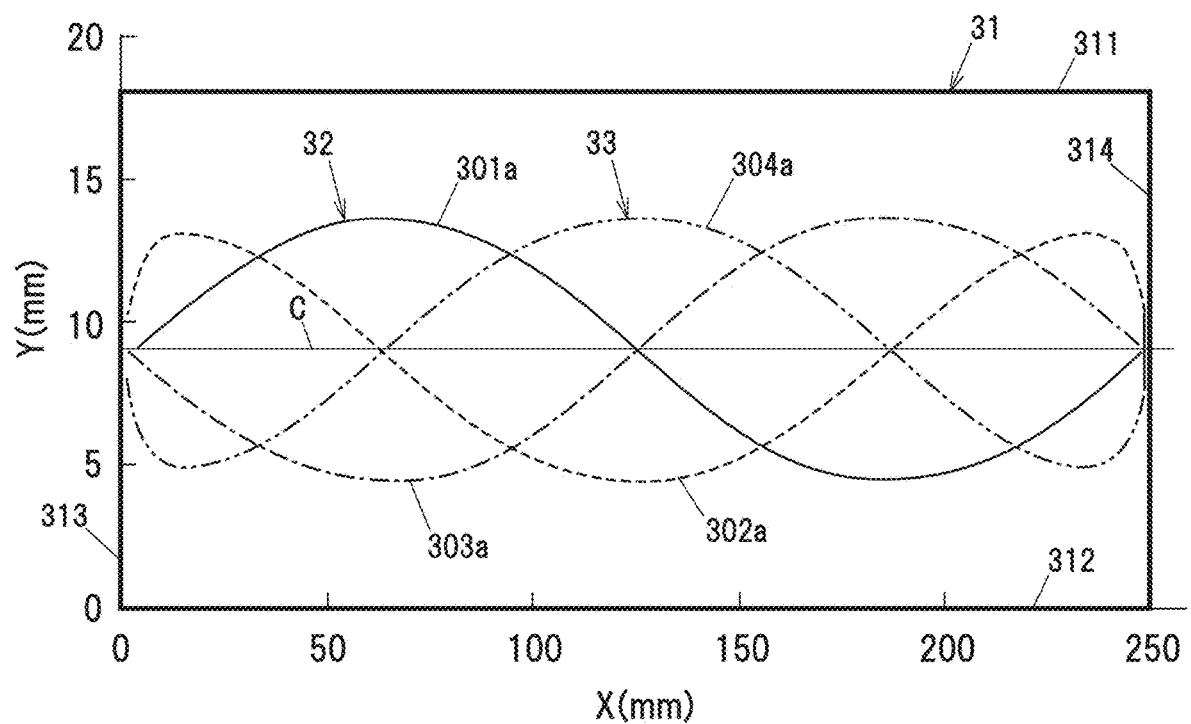
FIG. 16 is a schematic diagram showing shapes of sine wave shape detection coils and cosine wave shape detection coils according to another modified example.

FIGS. 15 and 16 show examples of the shapes of the sine wave shape detection coil 32 and the cosine wave shape detection coil 33 when the length $L_1$ of the first buffer region $E_1$ and the length $L_2$ of the second buffer region $E_2$ are changed. FIG. 15 shows the optimum shapes of the sine wave shape detection coil 32 and the cosine wave shape detection coil 33 when $L_1$ and $L_2$ are 3 mm. FIG. 16 shows the optimum shapes of the sine wave shape detection coil 32 and the cosine wave shape detection coil 33 when $L_1$ and $L_2$ are 1 mm. These modified examples also provide the same effects as described above.

(Modified Example of Target 2)

Figure 17:
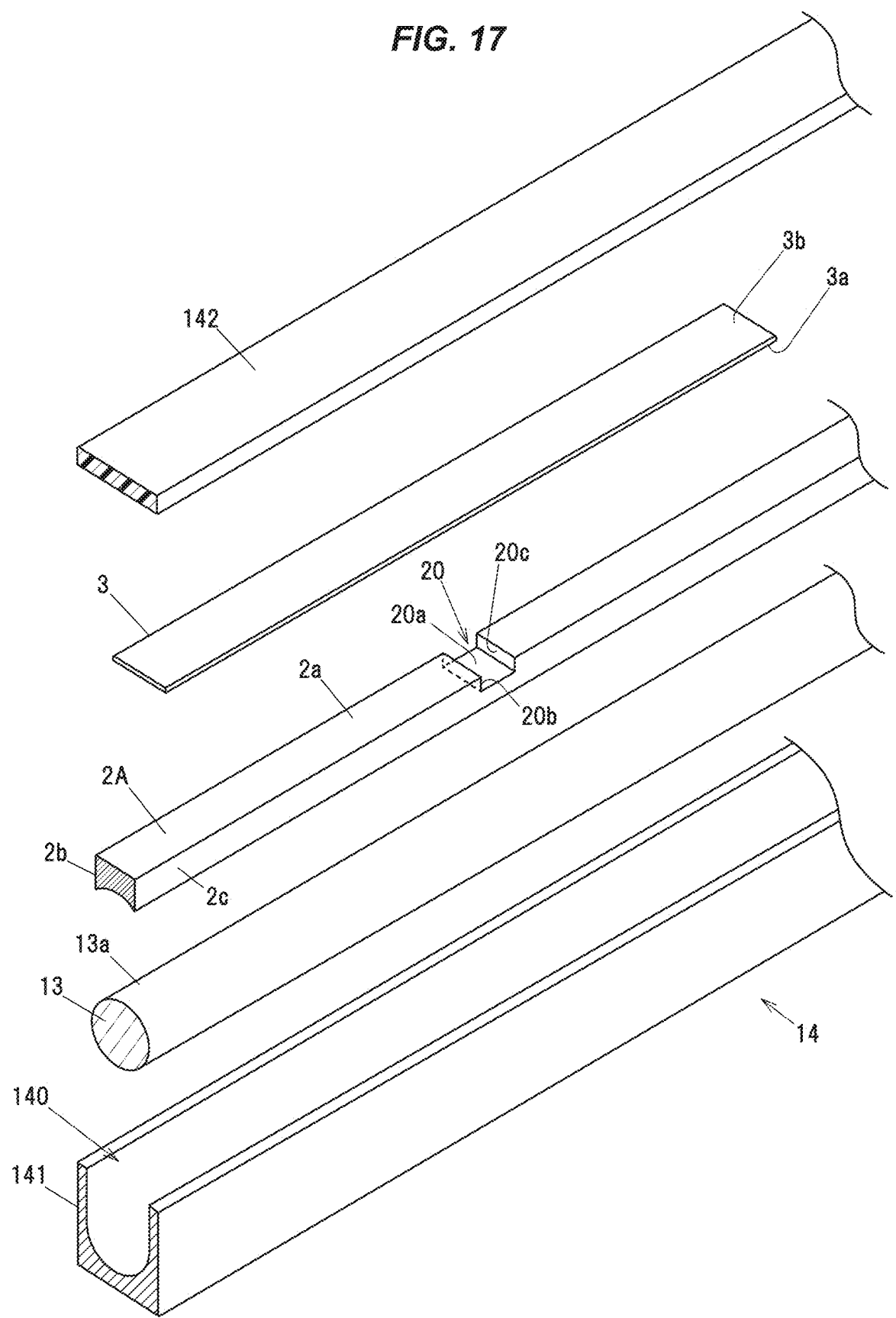
FIG. 17 is an exploded perspective view showing a structural example of a target according to a modified example together with a shaft, a substrate, and a housing.

FIG. 17 is an exploded perspective view showing a structural example of a target 2A according to a modified example together with a shaft 13, a substrate 3, and a housing 14. In the above embodiment, the case where the stroke sensor 1 is configured so that the target 2 is arranged to protrude from the outer peripheral surface 13a of the shaft 13 toward the substrate 3, and the eddy current generated in the target 2 by the alternating magnetic field of the excitation coil 31 reduces the density of the magnetic flux interlinking with the detection coils 32 and 33 in the portion facing the target 2 has been described. In the modified example shown in FIG. 17, the length of the target 2A in the axial direction of the shaft 13 is longer than the sine wave shape detection coil 32 and the cosine wave shape detection coil 33, and a recess (i.e., concave portion) 20 is formed in the target 2A. The recess 20 is recessed in a direction perpendicular to the substrate 3 from a facing surface 2a of the target 2A facing the substrate 3.

The recess 20 is formed along the lateral direction of the substrate 3 to traverse between both side surfaces 2b and 2c of the target 2A. A bottom surface 20a of the recess 20 is a plane parallel to the facing surface 2a, and both end surfaces 20b and 20c of the recess 20 face each other along the axial direction of the rack shaft 13 with the bottom surface 20a interposed therebetween. The depth of the recess 20 in the direction perpendicular to the facing surface 2a is, e.g., 5 mm. The target 2A is made of a material with a higher magnetic permeability than the rack shaft 13 or a material with a higher electrical conductivity than the rack shaft 13, like the target 2 in the above embodiment.

While the rack shaft 13 moves from one axial movement end to the other axial movement end, the bottom surface 20a of the recess 20 always faces the front surface 3a of the substrate 3, and the facing surface 2a of the target 2A faces the front surface 3a of the substrate 3 except for the portion where the recess 20 is formed. When u is the ratio of a length of the recess 20 in the axial direction of the rack shaft 13 to the length $L_3$ of the sine wave shape detection coil 32 and the cosine wave shape detection coil 33, the computing section 5 calculates the position of the rack shaft 13 within a length range of (1-u) $L_3$. The length of the detection target 2A in the axial direction of the rack shaft 13 is 2(1-u) $L_3$ or more.

Even when the target 2A according to this modified example is used, the magnitude of the voltage induced in the sine wave shape detection coil 32 and the cosine wave shape detection coil 33 changes according to the position of the target 2A with respect to the substrate 3, and the position of the target 2A can be calculated as in the embodiment.

SUMMARY OF EMBODIMENT

Next, technical ideas understood from the embodiment described above will be described with reference to the reference numerals and the like in the embodiment. However, each reference numeral in the following description does not limit the constituent elements in the claims to the members and the like specifically shown in the embodiment.

According to the first feature, a position detection device 1 for detecting a position of a shaft 13 moving forward and backward in an axial direction, includes a detection object such as targets 2, 2A attached to the shaft 13, an excitation coil 31 for generating an alternating magnetic field, a power source section 4 for supplying an alternating current to the excitation coil 31, and a detection coil 32, 33 arranged to be extending along an axial direction of the shaft 13 and being interlinked with a magnetic flux of the alternating magnetic field, wherein the excitation coil 31 is arranged to surround the detection coil 32, 33, and the detection coil 32, 33 includes a distorted curved portion being distorted with respect to a sine wave curve in such a manner that a peak value of a voltage induced in the detection coil 32, 33 changes into a sine wave shape when the shaft 13 moves along the axial direction at a constant speed.

According to the second feature, in the position detection device 1 according to the first feature, the detection coil 32, 33 has a larger amount of distortion with respect to the sine wave curve as a position closer to the excitation coil 31.

According to the third feature, in the position detection device 1 according to the first feature, the peak value of the voltage induced in the detection coil 32, 33 changes within a range of one cycle or less while the shaft 13 moves from one movement end in the axial direction to the other movement end in the axial direction.

According to the fourth feature, in the position detection device 1 according to the first feature, the detection coil 32, 33 includes a pair of curved portions 301a, 302a, 303a, 304a that are symmetrical about an axis of symmetry parallel to the axial direction of the shaft 13.

According to the fifth feature, in the position detection device 1 according to the first feature, the detection coil 32, 33 includes two detection coils, and phases of voltages induced in respective detection coils 32, 33 while the shaft 13 moves from one axial movement end to the other axial movement end are different from each other.

According to the sixth feature, in the position detection device 1 according to the fifth feature, the excitation coil 31 has a rectangular shape including a pair of long side portions 311, 312 extending in the axial direction of the shaft 13 and a pair of short side portions 313, 314 provided between the pair of long side portions 311, 312, and a width of one detection coil 33 of the two detection coils 32, 33 in a lateral direction of the excitation coil 31 has maximum values near both ends of the excitation coil 31 and near a central portion of the excitation coil 31, and the maximum values W331, W332 of the width of the one detection coil 33 near the both ends of the excitation coil 31 are smaller than the maximum value $W_{333}$ of the width of the one detection coil 33 near the central portion of the excitation coil 31.

According to the seventh feature, in the position detection device 1 according to the sixth feature, an other detection coil 32 of the two detection coils 32, 33 includes a minimum width in the lateral direction of the excitation coil 31 near the both ends of the excitation coil 31 and near the central portion of the excitation coil 31.

According to the eighth feature, in the position detection device 1 according to any one of the fifth to seventh features, the excitation coil 31 and the two detection coils 32, 33 are formed on one substrate 3.

According to the ninth feature, in the position detection device 1 according to the first feature, the shaft 13 is a rack shaft 13 of a steering device 10 of a vehicle.

Although the embodiment of the present invention has been described above, the embodiment described above do not limit the invention according to the scope of claims. Also, it should be noted that not all combinations of features described in the embodiment are essential to the means for solving the problems of the invention.

The invention claimed is:

1. A position detection device for detecting a position of a shaft moving forward and backward in an axial direction, comprising:
    a detection object attached to the shaft;
    an excitation coil for generating an alternating magnetic field;
    a power supply for supplying an alternating current to the excitation coil; and
    a detection coil arranged to be extending along an axial direction of the shaft and being interlinked with a magnetic flux of the alternating magnetic field,
    wherein the excitation coil is arranged to surround the detection coil, and the detection coil comprises a distorted curved portion being distorted with respect to a sine wave curve in such a manner that a peak value of a voltage induced in the detection coil changes into a sine wave shape when the shaft moves along the axial direction at a constant speed,
    wherein the detection coil comprises two detection coils, and phases of voltages induced in respective detection coils while the shaft moves from one axial movement end to the other axial movement end are different from each other, and
    wherein a width of one detection coil of the two detection coils in a lateral direction of the excitation coil has maximum values near both ends of the excitation coil and near a central portion of the excitation coil, and the maximum values of the width of the one detection coil near the both ends of the excitation coil are smaller than the maximum value of the width of the one detection coil near the central portion of the excitation coil.

2. A position detection device for detecting a position of a shaft moving forward and backward in an axial direction, comprising:
    a detection object attached to the shaft;
    an excitation coil for generating an alternating magnetic field;
    a power supply for supplying an alternating current to the excitation coil; and
    a detection coil arranged to be extending along an axial direction of the shaft and being interlinked with a magnetic flux of the alternating magnetic field,
    wherein the excitation coil is arranged to surround the detection coil, and the detection coil comprises a distorted curved portion being distorted with respect to a sine wave curve in such a manner that a peak value of a voltage induced in the detection coil changes into a sine wave shape when the shaft moves along the axial direction at a constant speed,
    wherein the detection coil comprises two detection coils, and phases of voltages induced in respective detection coils while the shaft moves from one axial movement end to the other axial movement end are different from each other, and
    wherein the excitation coil comprises a rectangular shape including a pair of long side portions extending in the axial direction of the shaft and a pair of short side portions provided between the pair of long side portions, and a width of one detection coil of the two detection coils in a lateral direction of the excitation coil has maximum values near both ends of the excitation coil and near a central portion of the excitation coil, and the maximum values of the width of the one detection coil near the both ends of the excitation coil are smaller than the maximum value of the width of the one detection coil near the central portion of the excitation coil.

3. The position detection device according to claim 2, wherein another detection coil of the two detection coils includes a minimum width in the lateral direction of the excitation coil near the both ends of the excitation coil and near the central portion of the excitation coil.

4. The position detection device according to claim 2, wherein the excitation coil and the two detection coils are provided on one substrate.

5. The position detection device according to claim 2, wherein the shaft comprises a rack shaft of a steering device of a vehicle.

6. The position detection device according to claim 2, wherein the detection coil comprises a larger amount of distortion with respect to the sine wave curve at a position closer to the excitation coil.

7. The position detection device according to claim 2, wherein the peak value of the voltage induced in the detection coil changes within a range of one cycle or less while the shaft moves from one movement end in the axial direction to the other movement end in the axial direction.

8. The position detection device according to claim 2, wherein the detection coil comprises a pair of curved portions that are symmetrical about an axis of symmetry parallel to the axial direction of the shaft.

* * * * *